United States Patent [19]
Sly

[11] 3,786,444
[45] Jan. 15, 1974

[54] MAGNETIC THIN FILM MEMORY PACKAGING DESIGN

[75] Inventor: Larry D. Sly, Minneapolis, Minn.

[73] Assignee: The United States of America as represented by the Secretary of the Army, Washington, D.C.

[22] Filed: Aug. 27, 1971

[21] Appl. No.: 173,511

[52] U.S. Cl. 340/174 TF, 340/174 GP, 340/174 M, 340/174 NC, 340/174 S, 340/174 MA
[51] Int. Cl. .......................... G11c 11/14, G11c 5/04
[58] Field of Search ................ 340/174 TF, 174 GP, 340/174 S

[56] References Cited
UNITED STATES PATENTS

| | | | |
|---|---|---|---|
| 3,381,281 | 4/1968 | Doughty et al. | 340/174 TF |
| 3,484,766 | 12/1969 | Constantinides et al. | 340/174 GP |
| 3,624,621 | 11/1971 | Moser | 340/174 GP |

*Primary Examiner*—James W. Moffitt
*Attorney*—Lawrence A. Neureither, Leonard Flank and Robert C. Sims

[57] ABSTRACT

A memory store unit is made by aligning film core areas and bonding them in pairs on either side of a single piece printed wire overlay. Top and bottom insulators are aligned and tacked to a backup board. An adhesive coated top ground plane is applied to the top insulator and the glass substrates. An adhesive epoxy cover is applied to the top ground plane. The top and bottom magnetic shields are applied to the cover and backup board, and the entire package is then subjected to compression and heat to adhere the laminations together into a flat dense package.

1 Claim, 19 Drawing Figures

Larry D. Sly
INVENTOR

BY Jack V. Voigt
Robert C. Sims

Larry D. Sly
INVENTOR

BY Jack W. Voigt
Robert C. Sims

Larry D. Sly,
*INVENTOR*

BY Jack W. Voigt
Robert C. Sims

Larry D. Sly,
INVENTOR

BY Jack W. Voigt
Robert C. Sims

MAGNETIC THIN FILM MEMORY PACKAGING DESIGN

BACKGROUND OF THE INVENTION

This invention is related to the field of memory core units for computers. In the past such memory core units required mechanical fixtures such as screws or bolts. These caused bulging and induced strain in the laminations of the core unit. Precise alignment of the film core arrays with respect to the single pieced printed wire overlay is not known in the prior art.

SUMMARY OF THE INVENTION

The memory store unit broadly consists of two circuit chassis modules and four identical memory substacks. A memory substack contains four 256-word by 68-bit memory planes sandwiched between a sense preamplifier board and digit driver board. The memory planes are mechanically connected by hinges and electrically connected by flexible strip-line cables so that the substack can be unfolded for repair or maintenance purposes. The memory plane consists of a word selection circuit assembly and two similar film core packet assemblies. The word selection circuits are comprised of discrete and integrated components mounted on a multilayer printed circuit board. The packet assemblies contain an array of 256 trifurcated work lines orthogonal to 68 bifurcated sense/digit lines. Films deposited in arrays on glass substrates are located at the intersection of each word and sense/digit line to form coupled film pairs. The packet consists of a laminated backup board, wherein the topmost layer serves as a bottom ground plane upon which four film core arrays are located. The overlay which consists of printed wiring for the word and common sense digit lines, is precisely aligned over the film core arrays. Four matching film core arrays are applied to the overlay to achieve the coupled film construction. Top and bottom insulators have apertures to receive the glass substrates of the film core arrays. The purpose of the insulators is to provide support to the printed wiring overlay and to maintain a uniform distance between the overlap and ground planes. Epoxy cover and magnetic shields complete the assembly. The purpose of the cover is to isolate the top ground plane from the top magnetic shield.

DESCRIPTION OF THE PREFERRED EMBODIMENT

Figure 1A:
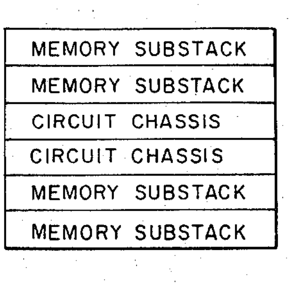
FIGS. 1A and 1B symbolically show the overall construction of the store assembly.
Figure 1B:
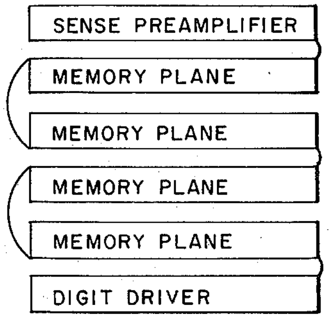
Figure 2:
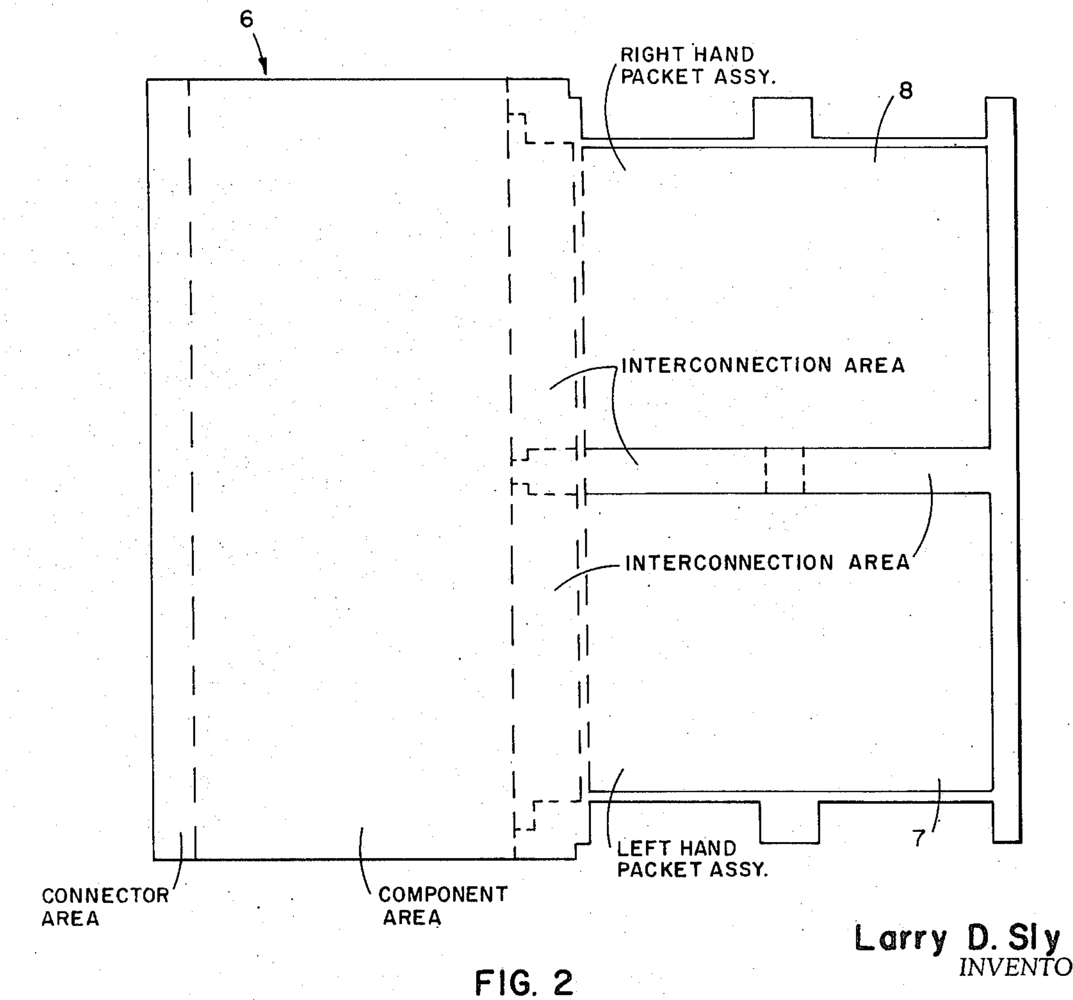
FIG. 2 symbolically shows the memory plane.
Figure 3A:
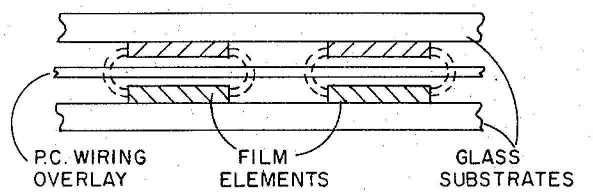
FIGS. 3A and 3B show the structure of the film pairs.
Figure 3B:
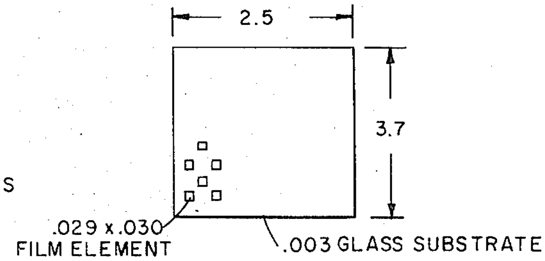

The overall memory store unit shown symbolically in FIG. 1A consists of two circuit chassis modules and four identical memory substacks. A memory substack shown in FIG. 1B contains four 256-word by 68-bit memory planes sandwiched between a sense preamplifier board 1 and digit driver board 3. The memory planes are mechanically connected by hinges (not shown) and electrically connected by flexible strip-line cables so that the substack can be unfolded for repair or maintenance purposes. As shown in FIG. 2, a memory plane consists of a word selection circuit assembly 6 and two similar film core packet assemblies 7 and 8 designated as the left hand and right hand packet assembly respectively. The word selection circuits are comprised of discrete and integrated components mounted on a multilayer printed circuit board as shown in FIGS. 3A and 3B. The packet assemblies (the memory area) contain an array of 256 trifurcated word lines orthogonal to 68 bifurcated sense/digit lines. Films deposited in arrays on glass substrates are located at the intersection of each word and sense/digit line to form coupled film pairs.

Figure 4A:
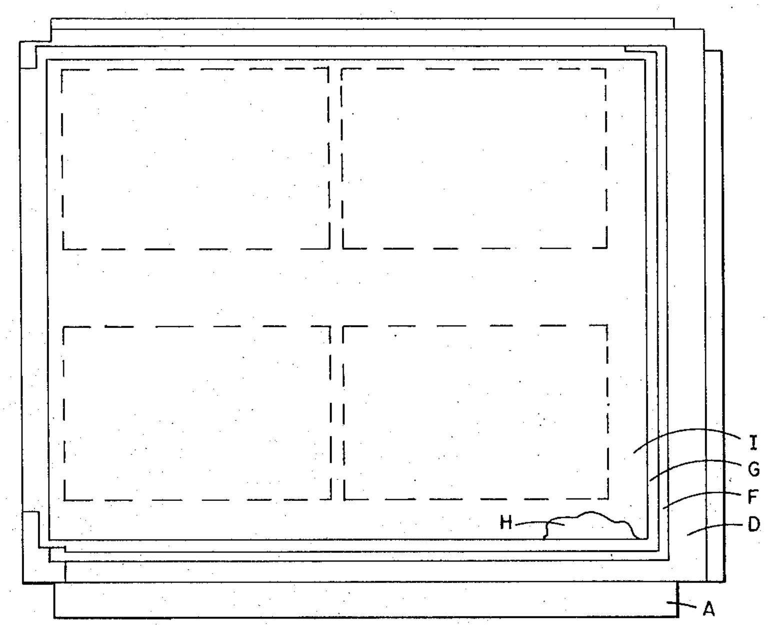
FIGS. 4A–C show three views of the packet memory element.
Figures 4B, 4C:
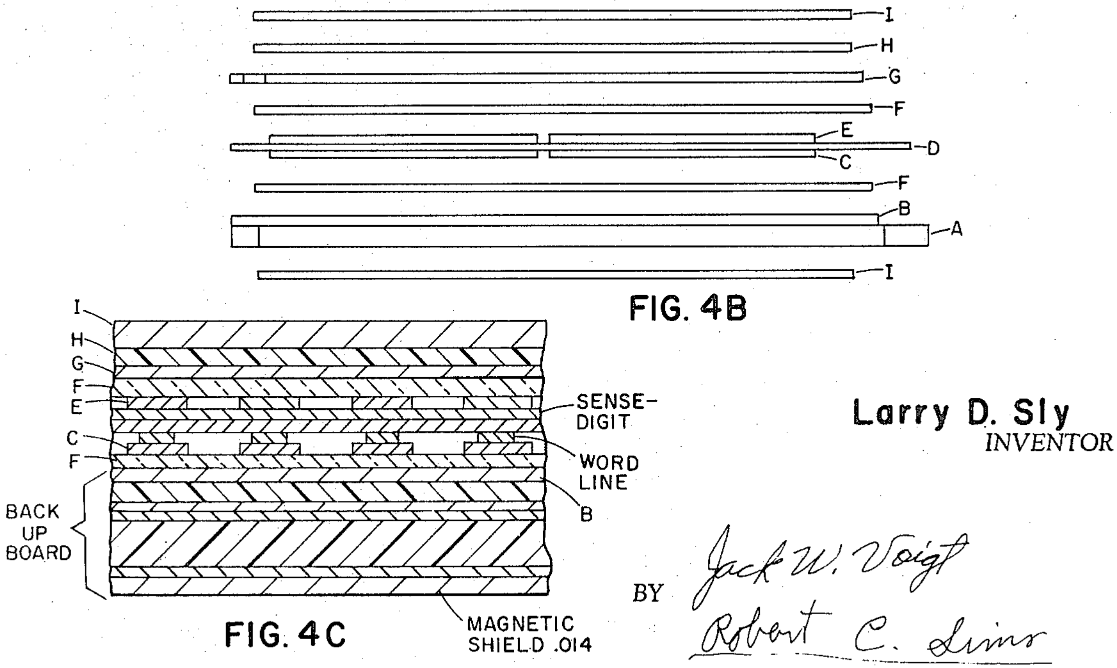

Referencing FIGS. 4A–C, the packet consists of a laminated backup board, A, wherein the topmost layer B serves as a bottom ground plane upon which four film core arrays C are located. The overlay D which consists of printed wiring for the word and common sense/digit lines is precisely aligned over the film core arrays. Four matching film core arrays E are applied to the overlay apertures to receive the glass substrates of the film core arrays. The purpose of the insulators is to provide support to the printed wiring overlay and to maintain a uniform distance between the overlay and ground planes G and B. The epoxy cover H and magnetic shields I complete the assembly. The purpose of the cover is to isolate the top ground plane from the top magnetic shield.

Figures 5A, 5B:
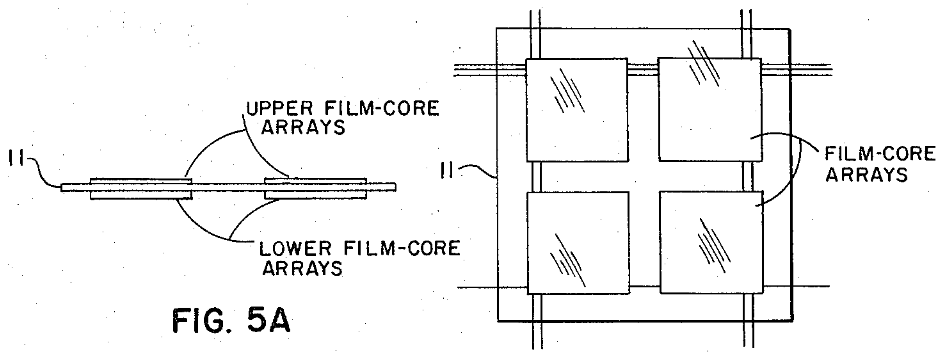
FIGS. 5A–K show the memory packet as it is being constructed.

The following sequence of laminations is involved to physically construct the packet assembly:

STEP 1 — The upper and lower film core arrays in each quadrant are independently aligned and bonded by compression and heat to the single-piece printed wiring overlay 11 as shown in FIGS. 5A and 5B. The alignment of the 0.029 × 0.030 inch films with respect to the word and sense/digit lines is such that the film core overlaps the word and sense/digit line by a minimum of 0.002 inch. The alignment of a film core pair is such that a maximum of 0.002 inch of the lower film core will extend beyond the edge of the upper film core.

Figure 5C:
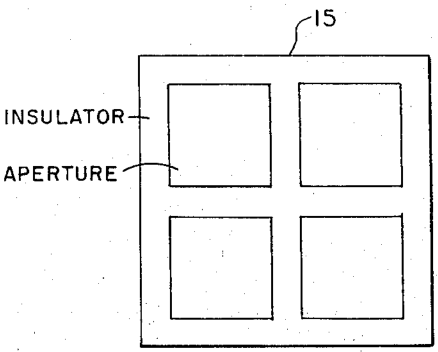
Figure 5K:
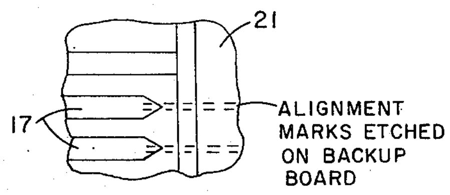
Figure 5D:
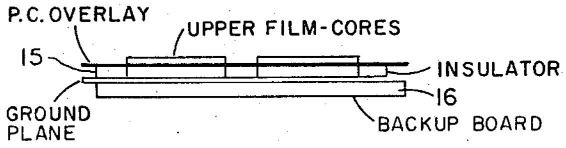
Figure 5E:
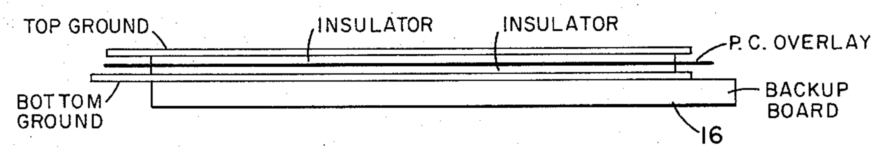

STEP 2 — The adhesive-coated bottom insulator 15 shown in FIGS. 5C–E is precisely aligned (by use of two alignment pins) and tacked to the backup board 16. The lower film core arrays of the overlay subassembly are then inserted in the apertures of the bottom insulator so that the glass substrates rest on the adhesive-coated bottom ground plane. Next, the center line of the tabs 17 in the overlay are accurately aligned to within 0.003 inch of index marks etched on the backup board 21 as shown in FIG. 5K.

STEP 3 — The apertures in the top insulator are aligned with the upper film core arrays of the overlay subassembly and the adhesive-coated insulator is then tacked to the printed wiring of the subassembly. Next, the adhesive coated top ground plane is applied to the top insulator and glass substrates of the upper film core arrays as shown in FIG. 5E.

STEP 4 — The laminations of steps 1 through 3 are bonded together by compression and heat.

Figure 5F:
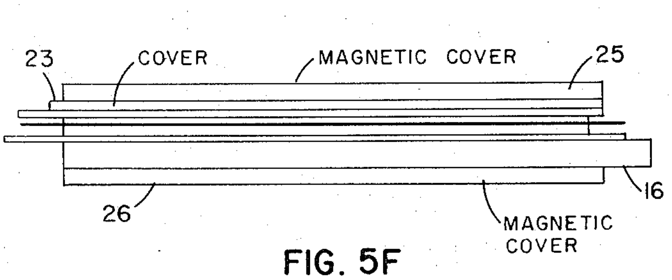

STEP 5 — The adhesive coated epoxy cover 23 is applied to the top ground plane as shown in FIG. 5F. Next, the adhesive coated top and bottom magnetic shield 25 and 26 are applied to the cover 23 and backup board 16 respectively, and the entire packet assembly is then subjected to compression and heat to adhere the laminations together without mechanical means such as screws and bolts. The fabrication process results in a flat, dense package, free from bulging layers.

Figure 5G:
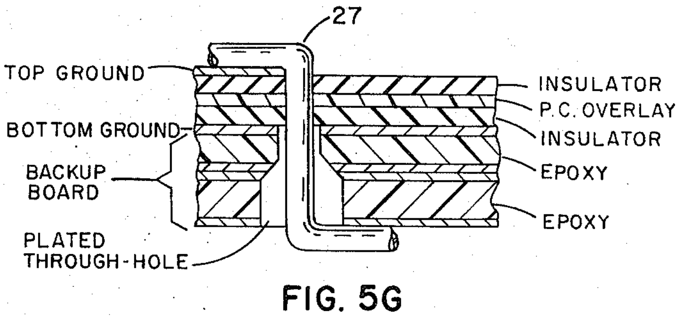

STEP 6 — Because the upper and lower ground planes serve as a return path for word currents, it is important that the ground planes exhibit an identical ground system to both halves of a coupled film pair. To achieve a common ground system the two ground planes are connected on three sides of the packet assembly. Connection on two sides is accomplished by passing a plurality of conductive ground pins 27 from the top ground plane through holes in the top insulator, the overlay, the bottom insulator, and through plated through-holes in the laminated backup board. The backup board is constructed of two double copper clad epoxy boards wherein the top copper layer serves as the bottom ground plane. The ground pins are soldered to the top ground plane and the accessible side of the backup board as shown in FIG. 5G. It will be observed that with the use of plated through-holes in the backup board, a solder connection on the accessible side is electrically equivalent to a connection on the bottom ground plane.

Figure 5H:
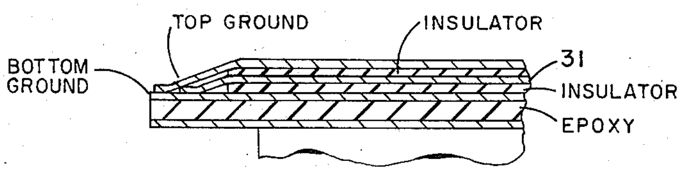

STEP 7 — FIG. 5H shows that one end of the word line tabs 31 and the corresponding edge of the top ground plane are soldered to the bottom ground plane to complete the packet assembly.

Figure 5I:
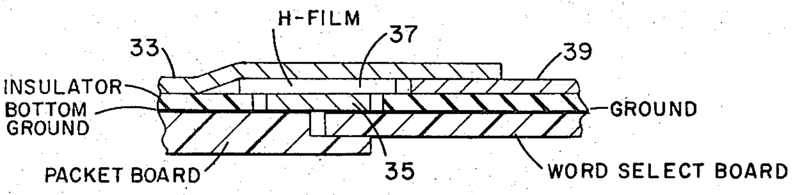

As shown in FIG. 5I, intraplane connection between a packet assembly and word selection assembly is achieved by (1) folding back the word tabs 33 extending from the packet assembly, (2) soldering a ground splice 35 (containing an H-film insulator mat 37) to the bottom ground plane of the packet assembly and ground plane of the word selection assembly, and (3) laying down and soldering the packet word tabs 35 to the selection word tabs 39 as shown.

Figure 5J:
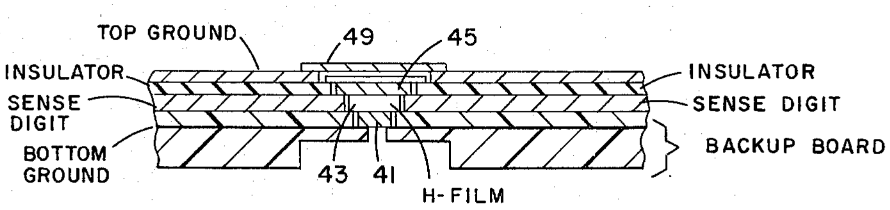

The method for intraplane connection between left and right hand packet assemblies is shown in FIG. 5J. The connection scheme consists of (1) soldering the bottom ground splice 41 (containing an H-film insulator mat 43) to the bottom ground planes of the packet assemblies, (2) soldering the crossover tabs 45 (containing an insulator mat) to the sense/digit terminations on the packet assemblies and (3) soldering the top ground splice 49 to the top ground planes.

I claim:

1. A memory packet assembly comprising a circuit overlay; film core arrays sandwiching said circuit overlay and aligning therewith; said film core arrays being deposited on glass substrates; top and bottom insulator each having apertures to receive the glass substrates of the film core arrays; said top and bottom insulators sandwiching the film core arrays; a laminated backup board having a top layer which serves as a bottom ground plane; a top ground plane means; said backup board and the top ground plane means sandwiching the top and bottom insulators; two shields sandwiching the top ground plane means and the backup board; said packet assembly is bonded together into a flat, dense package; ground pins connected through the assembly so as to electrically connect the top ground plane means with the bottom ground plane; and wherein the circuit overlay consists of printed wiring for word and common sense/digit lines.

* * * * *